(12) United States Patent
Conte

(10) Patent No.: US 7,043,825 B2
(45) Date of Patent: May 16, 2006

(54) CABLE-PROCESSING DEVICE

(75) Inventor: Alois Conte, Ebikon (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 10/775,607

(22) Filed: Feb. 10, 2004

(65) Prior Publication Data
US 2004/0158976 A1    Aug. 19, 2004

(30) Foreign Application Priority Data

Feb. 17, 2003  (EP)  ................... 03405094

(51) Int. Cl.
*B23B 19/00* (2006.01)
*H01R 43/00* (2006.01)

(52) U.S. Cl. .................. 29/748; 29/749; 29/755; 29/33 F; 294/64.1; 414/816

(58) Field of Classification Search ............... 29/33 M, 29/745–749, 33 F, 594.6, 868, 753; 414/746.3, 414/736; 901/6, 30; 294/64, 64.1
See application file for complete search history.

(56) References Cited

U.S. PATENT DOCUMENTS

| 3,731,821 A | 5/1973 | Wallis | |
| 4,678,393 A * | 7/1987 | Mink | 198/468.2 |
| 4,733,457 A | 3/1988 | Tega et al. | |
| 5,305,508 A * | 4/1994 | Koch et al. | 29/33 M |
| 5,412,855 A * | 5/1995 | Koch | 29/33 M |
| 6,357,575 B1 * | 3/2002 | Conte | 198/468.2 |
| 6,658,726 B1 * | 12/2003 | Conte | 29/753 |
| 6,886,438 B1 * | 5/2005 | Viviroli et al. | 83/13 |
| 2003/0180137 A1 * | 9/2003 | Schuster | 414/746.3 |
| 2004/0068851 A1 * | 4/2004 | Lustenberger et al. | 29/33.52 |

FOREIGN PATENT DOCUMENTS

| DE | 22 54 784 | 5/1973 |
| EP | 1 032 095 | 8/2000 |

* cited by examiner

*Primary Examiner*—Minh Trinh
(74) *Attorney, Agent, or Firm*—Butzel Long

(57) ABSTRACT

A cable-processing device includes a first drive for swiveling movement and a second drive for linear movement of a swivel-arm. The swivel-arm is held on a bracket for rotation about an axle with a spring force acting counterclockwise on the swivel-arm. A gripper on the end of the swivel-arm holds a cable-end between first and second gripper-jaws. The jaws are arranged rotatably on an axle and are opened and closed by means of gears. To reduce the swivel-arm mass to be moved, the actuator for the gears is arranged on the swivel-arm.

18 Claims, 6 Drawing Sheets

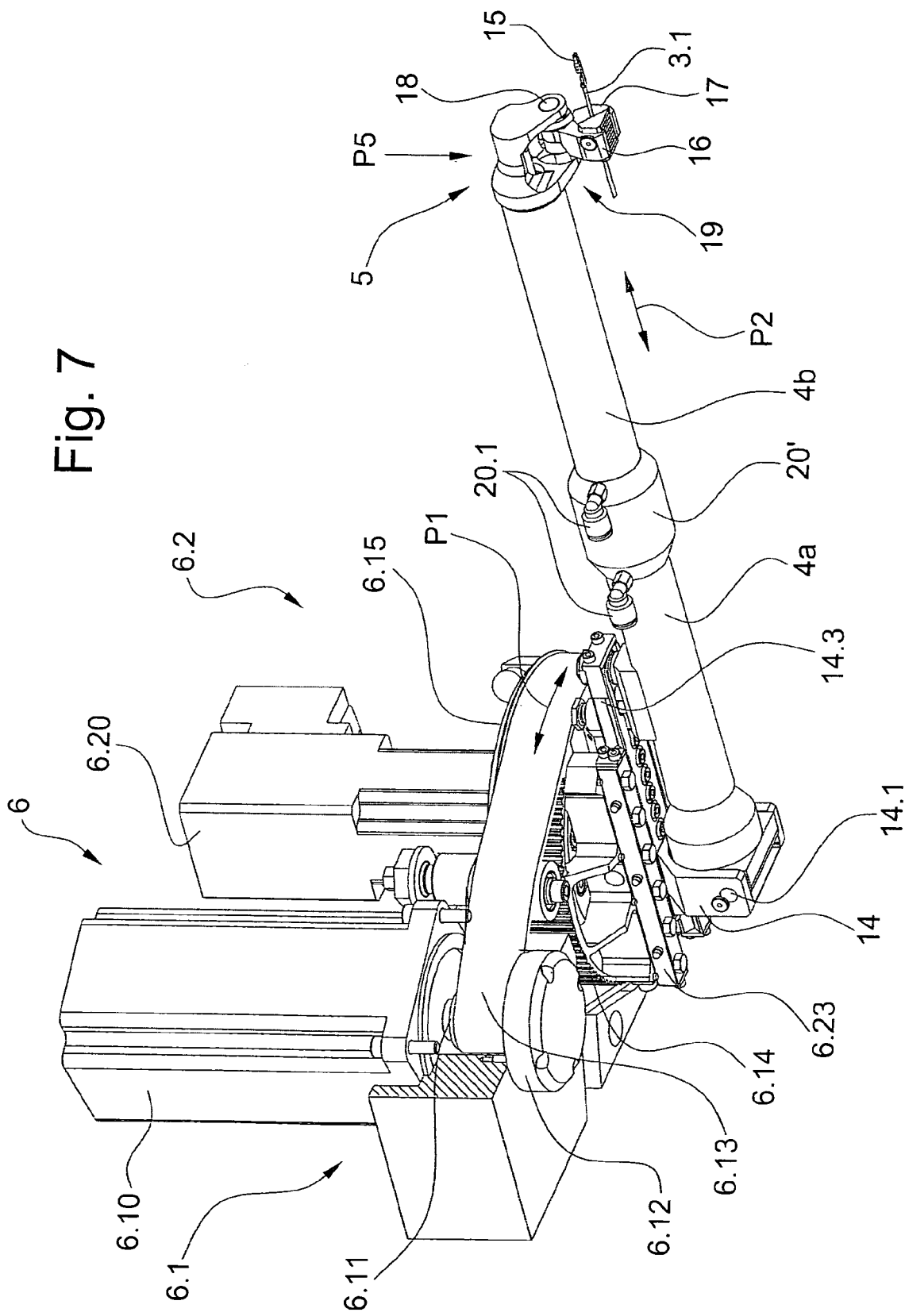

CABLE-PROCESSING DEVICE

BACKGROUND OF THE INVENTION

The present invention relates to a cable-processing device with processing stations for processing a cable and having at least one swivel-arm as a feeder to feed the cable to the processing stations.

Usually, the processing stations of a cable-processing machine are arranged in a circle. The greater the number of processing operations undertaken on the cable-ends, the greater the number of processing stations needed, and the greater the radius of the circle in which they are arranged. A greater radius of the circle makes cable-feeders with longer swivel-arms necessary. Long swivel-arms with cable-grippers arranged on their free ends have large masses. In addition, there is the mass of the gripper and of the gripper-drive arranged in the gripper.

A disadvantage of the known feeders is that with longer arms larger drives are needed. Larger drives in turn require a larger cable-processing machine overall.

SUMMARY OF THE INVENTION

The present invention concerns an apparatus that avoids the disadvantages of the above-described known device and creates a cable-feeder in which the ratio of the moved mass of the swivel-arm, including gripper, to the mass of the moved cable is low.

The advantages achieved by the device according to the present invention are that with its mass reduced, the swivel-arm can be built longer. The lighter swivel-arm can be moved faster by the same drive. Furthermore, with the gripper-drive arranged outside the gripper, the mass of the gripper to be moved is substantially reduced. The gripper construction according to the present invention comprises a low-mass conversion of a linear force into two rotational movements with opposite and symmetrical paths. The minimum distance between the cable-axis and the lowest point of the gripper with the gripper-jaws open which is required when advancing the cable is provided by the gripper construction according to the present invention. Both gripper-jaws rotate around a concentric axis of rotation, the change in height for gripping cables of different diameter thereby being minimized.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 7 is a view similar to FIG. 2 showing an alternate embodiment of the gripper-drive in accordance with the present invention.

DESCRIPTION OF THE PREFERRED EMBODIMENT

Figure 1:
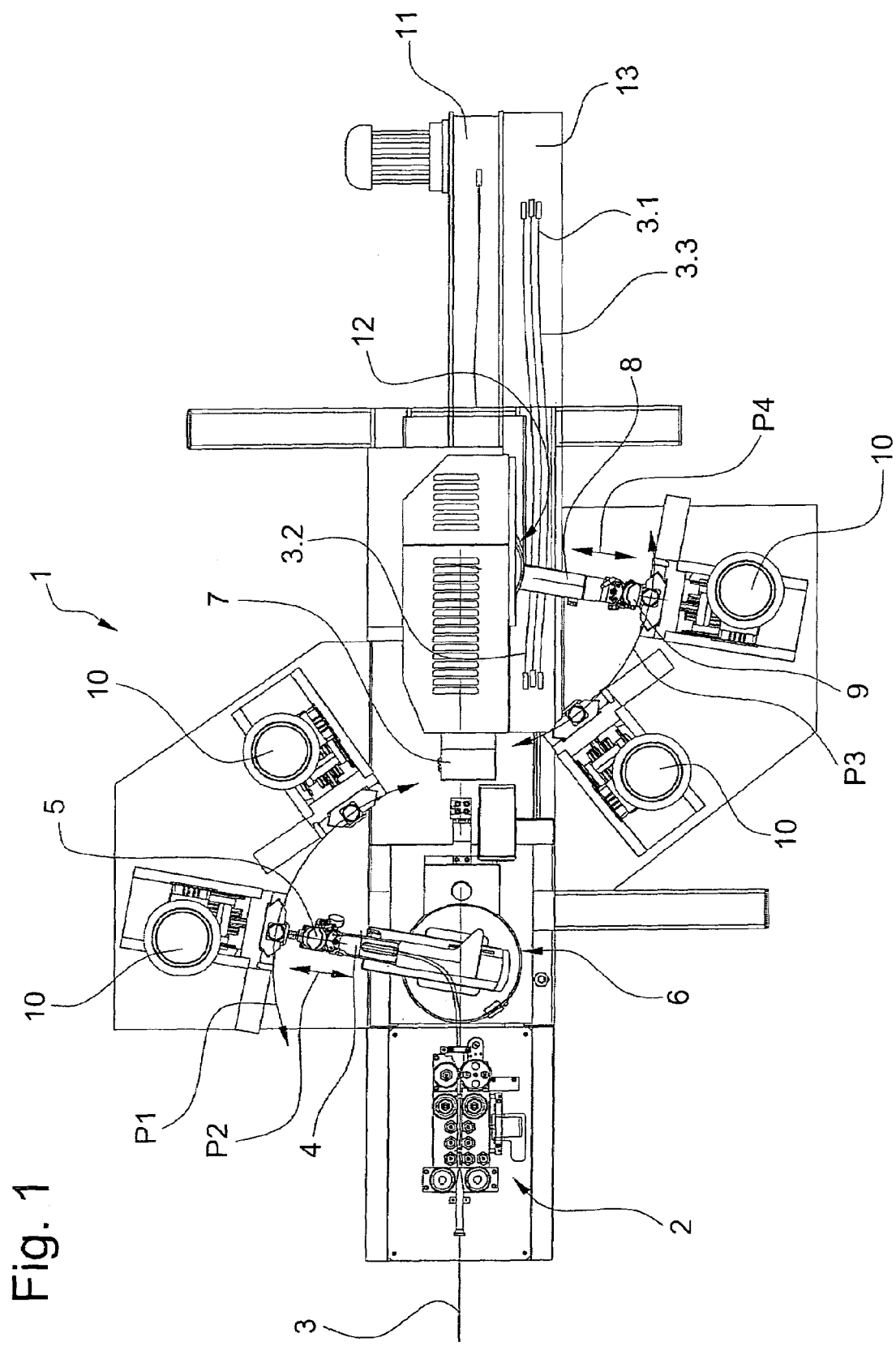
FIG. 1 is a top plan view of a cable-processing machine with two swivel-arms according to the present invention.

FIG. 1 shows a cable-processing machine 1 with a cable-advancer executed as a belt-drive 2, the belt-drive 2 feeding an electrical cable 3 to a swivel-arm feeder having a first swivel-arm 4 with a first gripper 5. By means of first drives 6, the first swivel-arm 4 can be set into a swiveling motion symbolized by an arrow P1, and/or into a linear motion symbolized by an arrow P2. By means of cutting/stripping knives 7, downstream of the first swivel-arm 4, the cable 3 can be cut off and/or stripped of insulation.

Further, the cable-processing machine 1 has a second swivel-arm feeder having a second swivel-arm 8 with a second gripper 9. By means of second drives 12, the second swivel-arm 8 can be caused to move in a swiveling motion symbolized by an arrow P3 and/or in a linear motion symbolized by an arrow P4. By means of the rotational motion P1 and the linear motion P2, the first swivel-arm 4 functions as a feeder serving leading cable-ends 3.1 to adjacent ones of processing stations 10 (for example, crimping presses and/or seal mounters) arranged to the side of the longitudinal cable-axis. By means of the rotational motion P3 and the linear motion P4 imparted to it by the second drives 12, the second swivel-arm 8 functions as a feeder serving trailing cable-ends 3.2 to adjacent ones of the processing stations 10 (for example, crimping presses and/or seal mounters) arranged to the side of the longitudinal cable-axis. After the leading cable-end 3.1 has been processed, the cable 3 is transported further by means of a transportation belt 11. The second gripper 9 grasps the trailing cable-end 3.2, after which a cable length 3.3 of the cable 3 is cut off, and the trailing cable-end 3.2 is stripped of insulation and fed to the adjacent processing stations 10. After the trailing cable-end 3.2 has been processed, the cable length 3.3 goes into a tray 13.

Figure 2:
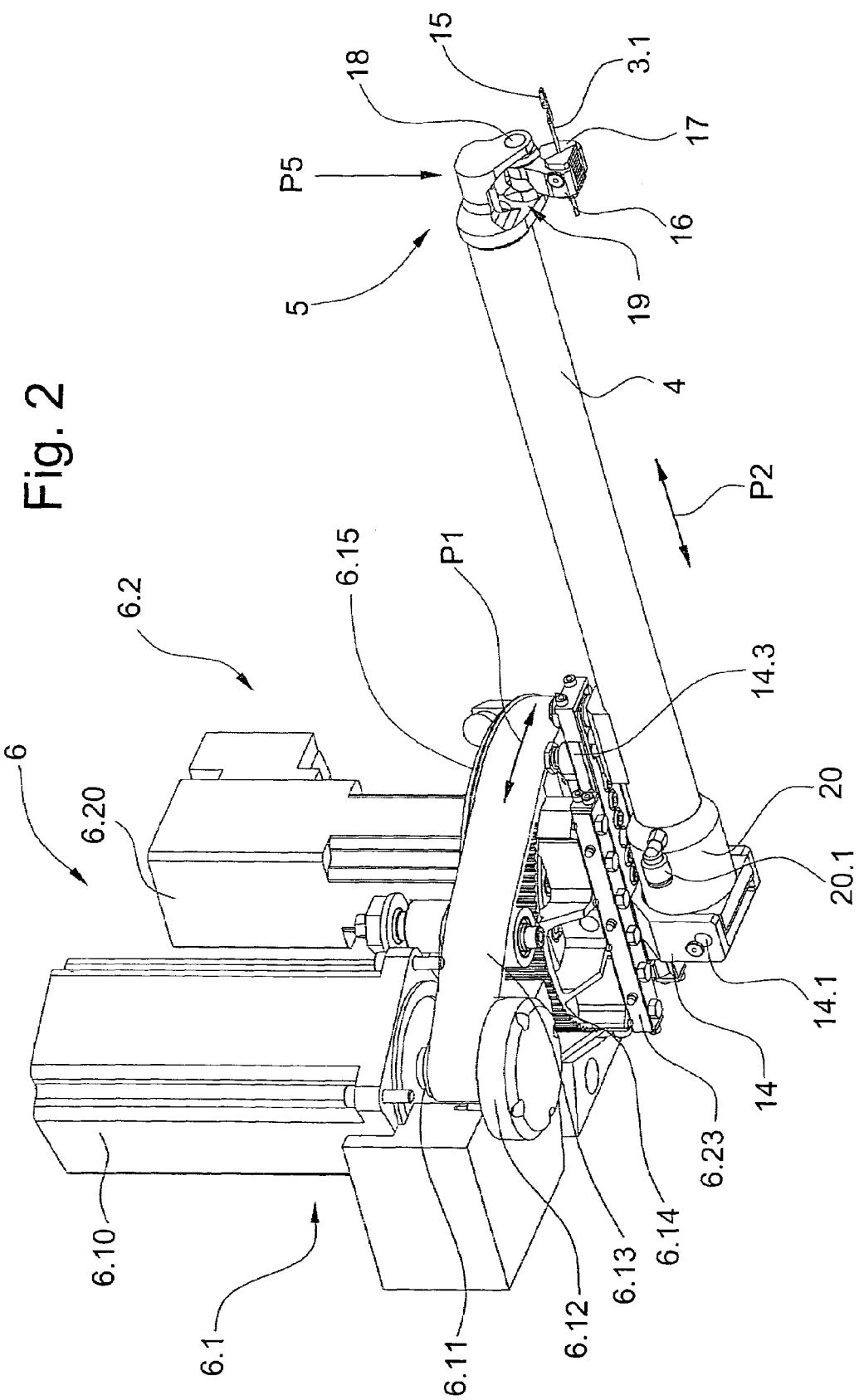
FIG. 2 is an enlarged perspective view showing details of the swivel-arms with gripper shown in FIG. 1.

FIG. 2 shows details of the first swivel-arm 4 with the first gripper 5. The construction of the second swivel-arm 8 with the second gripper 9 is identical to the construction of the first swivel-arm 4 with the first gripper 5. The first drives 6 consist of a drive 6.1 for generating the swiveling motion P1, and of a drive 6.2 for generating the linear motion P2, of the swivel-arm 4. The drive 6.1 has a drive-pinion 6.11 that is driven by a motor 6.10, and a shaft-encoder 6.12 registering the motion of the pinion. By means of belts 6.13, the rotational motion of the drive-pinion 6.11 is transferred to a belt-pulley 6.14 which is a component of a turntable 6.15 on which the drive 6.2 for the linear motion P2 of the swivel-arm 4 is arranged. The first swivel-arm 4 is held rotatably about an axle 14.1 in a bracket 14, with spring-force acting counterclockwise on the swivel-arm 4. For the purpose of inserting the stripped end of the leading cable-end 3.1 into, for example, a crimp contact 15, during the crimping operation a force P5 exerted by a crimping press (not shown) on the gripper 5 acts against the spring-force, the swivel-arm executing with the gripper 5 a rotating motion in a clockwise direction. The leading cable-end 3.1 is held by a first gripper-jaw 16 and a second gripper-jaw 17 of the gripper 5. The jaws 16, 17 are arranged rotatably about an axle 18 and are opened and closed by means of gears 19.

Figure 3:
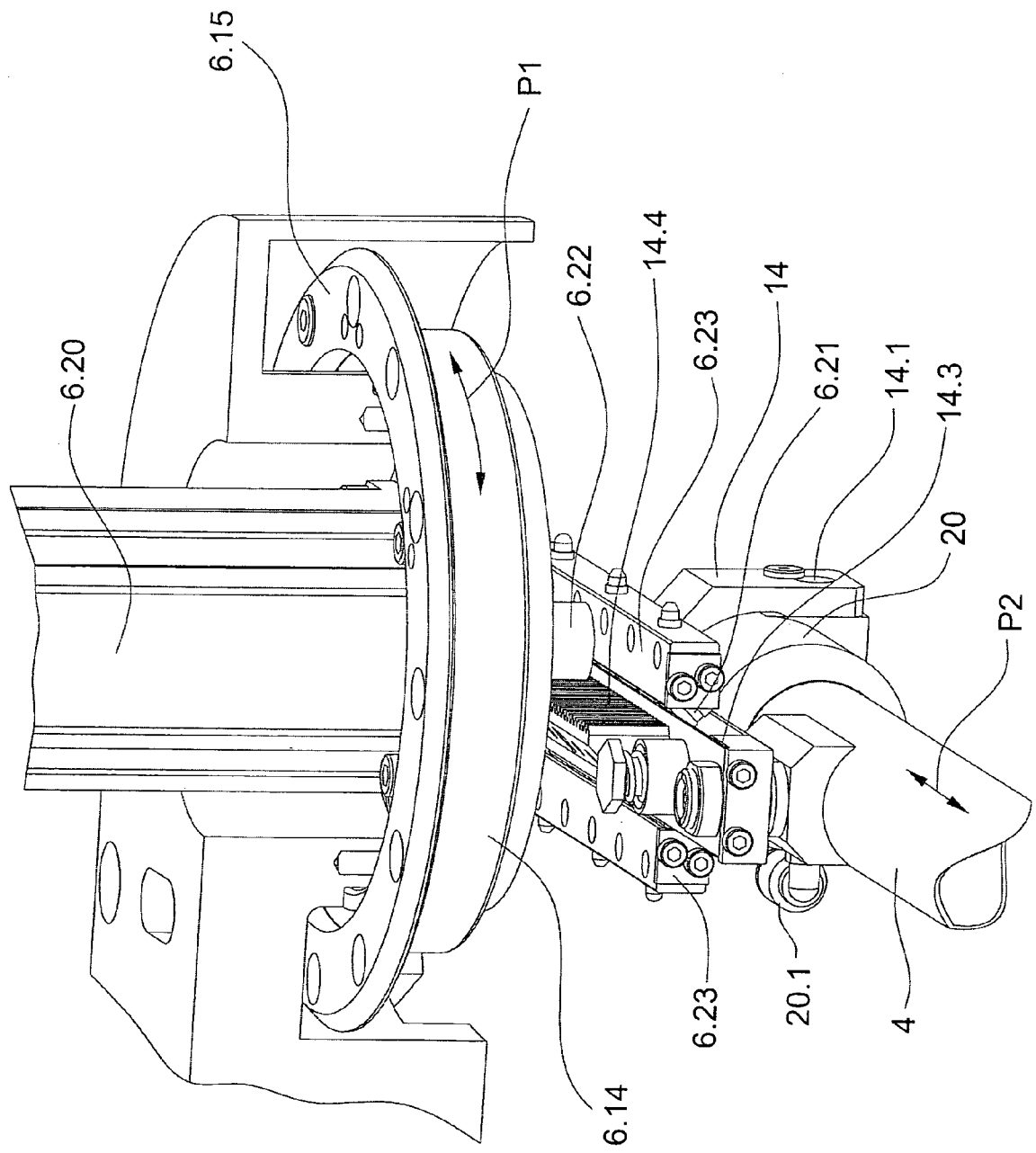
FIG. 3 is an enlarged perspective view showing details of the swivel-arm linear drive shown in FIG. 2.

FIG. 3 shows the drive 6.2 for the linear motion P2 of the swivel-arm 4. The swivel-arm 4 is guided by means of a linear guide 6.23 arranged on the turntable 6.15, with a prism-shaped bearing 6.21 guiding a linear guide 14.3 of the swivel-arm 4. A pinion 6.22 of the motor 6.10 arranged on the turntable 6.15 engages with a rack arranged on the linear guide 14.3, the rotational motion of the pinion 6.22 being converted into the linear motion P2.

Figure 4:
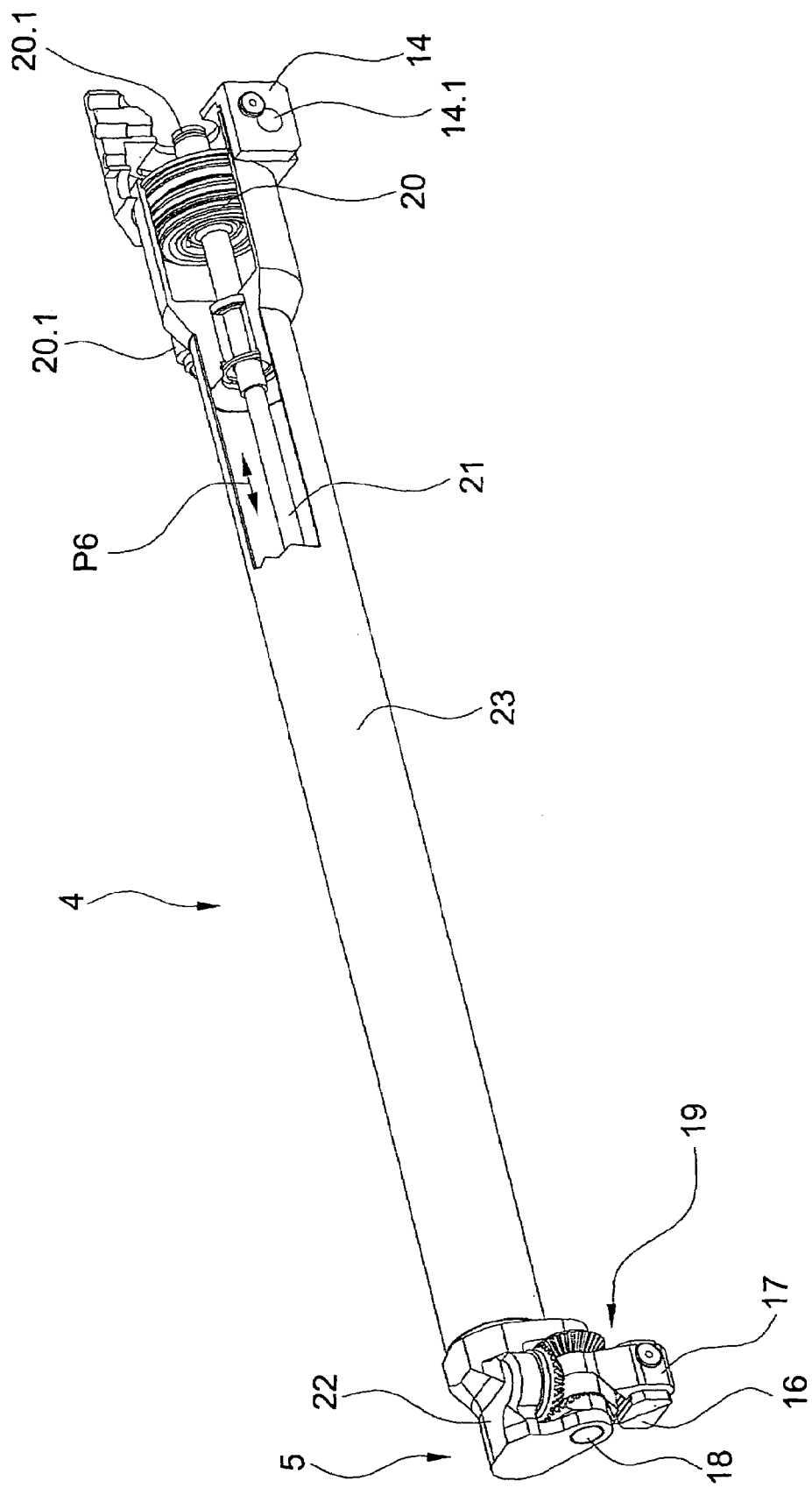
FIG. 4 is an enlarged perspective view in partial cut-away of the gripper with gripper-drive shown in FIG. 2.

FIG. 4 shows the first swivel-arm 4 with first gripper 5 and a gripper-drive arranged on or in the swivel-arm 4, the gripper-drive consisting essentially of an actuator 20. Serving to transmit force to the gear 19 is a rod 21. The actuator 20 can be, for example, a pneumatic cylinder, which can be supplied with compressed air through a connection 20.1. The rod 21 can also be actuable by means of an electric actuator (not shown) substituted for the pneumatic actuator 20. The actuator 20 actuates the rod 21, made for example of aluminum, in the directions symbolized by a double-headed arrow P6. At one end, the rod 21 is connected to the actuator 20 arranged on the swivel-arm 4, and at the other end, the rod 21 is connected to the gear 19 of the gripper 5 which is arranged in a housing 22. The rod 21 is surrounded by a tube 23 of the swivel-arm 4, which tube can be made for example of plastic.

Figure 5:
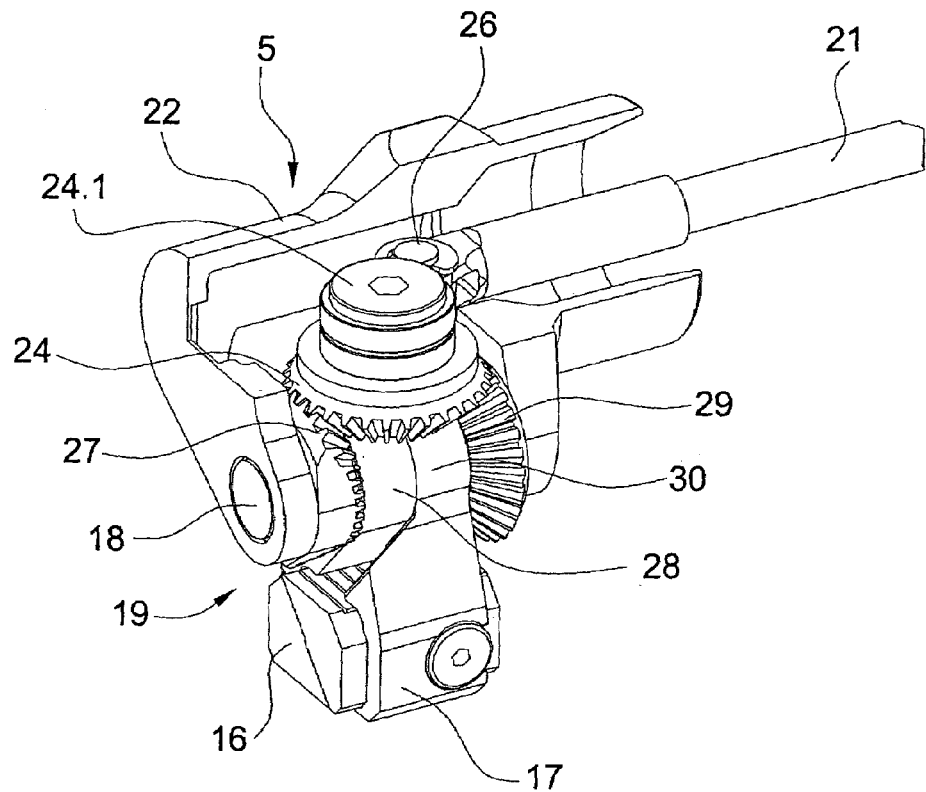
FIG. 5 is an enlarged perspective view in partial cut-away of the gripper of FIG. 4 shown in a closed position.
Figure 6:
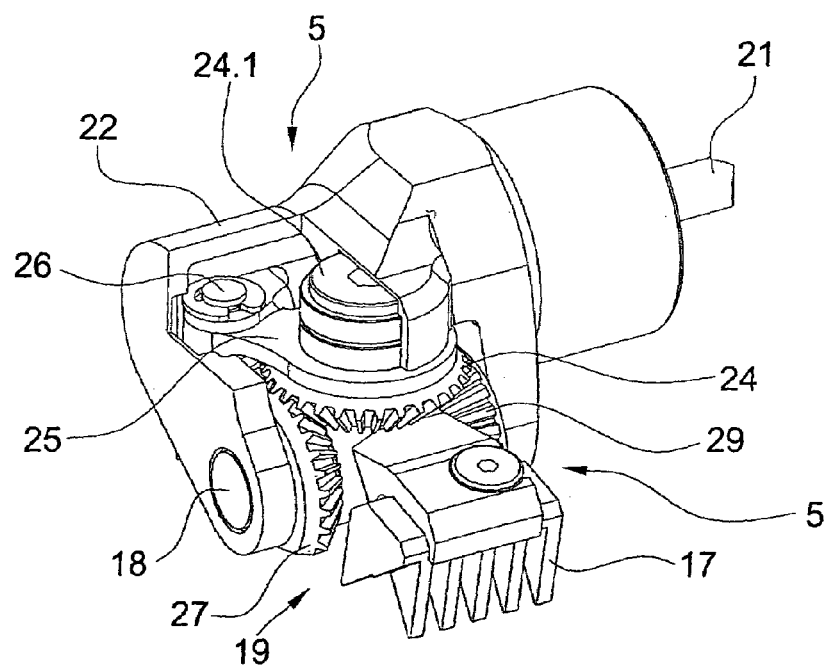
FIG. 6 is a view similar to FIG. 5 showing the gripper in an open position.

FIG. 5 and FIG. 6 show the construction of the first gripper 5, FIG. 5 showing the gripper 5 in a closed position and FIG. 6 showing the gripper 5 in an open position. The gear 19 consists of a bevel-gear 24 supported by means of an axle 24.1 in a bearing on the housing 22 and having a lever 25 (FIG. 6), on which an axle 26 is arranged. The rod 21 is connected in an articulated manner to the axle 26. The bevel-gear 24 engages with a bevel-gear 27 connected with a gripper-lever 28 of the first gripper-jaw 16 and with a bevel-gear 29 connected with a gripper-lever 30 of the second gripper-jaw 17. Both gripper-levers 28, 30 are held in an articulated manner on the axle 18. The cable-center of the gripper 5 is therefore independent of the cable diameter and remains stationary.

By means of the gear 19, the linear motion P6 of the rod 21 is converted into two rotational movements with opposite, symmetrical paths, the actuator 20 pulling the rod 21 to close the gripper-jaws 16, 17 and hold the cable-end 3.1, and pushing the rod 21 to open the gripper jaws 16, 17 and release the cable-end 3.1.

In the exemplary embodiment shown, the gripper 5 is arranged at one end of the swivel-arm 4 and the actuator 20 is arranged at the other end of the swivel-arm 4. Depending on the actuator 20 (pneumatic, electric, etc.), and depending on the rod 21 (material, shape, dimensions, etc.), and taking into consideration the optimized total moved mass of the swivel-arm 4, the actuator as shown in FIG. 7 can also be arranged closer to the gripper 5. In FIG. 7, an actuator 20' is positioned between a first swivel-arm first portion 4a, extending from the bracket 14, and a first swivel arm second portion 4b, attached to the gripper 5.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cable-processing device having processing stations for processing an electrical cable and at least one swivel-arm feeder feeding the cable to the processing stations, comprising:
    a swivel-arm having one end mounted adjacent the processing stations for swiveling movement and linear movement of said swivel-arm relative to the processing stations;
    a gripper mounted on an opposite end of said swivel-arm for gripping and releasing a cable-end; and
    an actuator ranged on said swivel-arm spaced from said gripper and being connected to actuate said gripper to open and close gripper-jaws of said gripper.

2. The device according to claim 1 wherein said actuator generates a linear movement for actuating said gripper.

3. The device according to claim 2 wherein said actuator imparts the linear movement through a rod to a gear of said gripper, said gear converting the linear movement into two rotational motions with opposite, symmetrical paths.

4. The device according to claim 3 where in said gear includes a bevel-gear rotated by said rod and which engages with two further bevel-gears each driving an associated gripper-lever having one of said gripper-jaws for engaging the cable-end.

5. The device according to claim 4 wherein said further bevel-gears and said gripper-levers are arranged on an axle.

6. The device according to claim 1 wherein said actuator is connected to said gripper through an interior of said swivel-arm.

7. The device according to claim 1 wherein said actuator is mounted at said one end of said swivel-arm.

8. The device according to claim 1 wherein said swivel-arm includes two portions extending between said one end and said opposite end and wherein said actuator is mounted between said portions.

9. A cable-processing device having processing stations for processing an electrical cable, comprising:
    at least one processing station;
    at least one swivel-arm having one end mounted for swiveling movement and linear movement of said at least one swivel-arm toward and away from said at least one processing station;
    a gripper mounted on an opposite end of said at least one swivel-arm for gripping and releasing a cable-end; and
    an actuator arranged on said at least one swivel-arm spaced from said gripper and being connected to actuate said gripper to open and close gripper-jaws of said gripper.

10. The device according to claim 9 wherein said actuator is mounted at said one end of said at least one swivel-arm.

11. The device according to claim 9 wherein said at least one swivel-arm includes two portions extending between said one end and said opposite end and wherein said actuator is mounted between said portions.

12. The device according to claim 9 wherein said actuator imparts a linear movement through a rod to a gear of said gripper, said gear converting the linear movement into two rotational motions with opposite, symmetrical paths.

13. The device according to claim 12 where in said gear includes a bevel-gear rotated by said rod and which engages with two further bevel-gears each driving an associated gripper-lever having one of said gripper-jaws for engaging the cable-end.

14. The device according to claim 13 wherein said further bevel-gears and said gripper-levers are arranged on an axle.

15. The device according to claim 9 wherein said actuator is connected to said gripper through an interior of said at least one swivel-arm.

16. A cable-processing device having processing stations for processing an electrical cable and at least one swivel-arm feeder feeding the cable to the processing stations, comprising:
    a swivel-arm having one end mounted for swiveling movement and linear movement of said swivel-arm;

a gripper mounted on an opposite end of said swivel-arm for gripping and releasing a cable-end; and an actuator arranged on said swivel-arm and being connected to actuate said gripper, said actuator generating a linear movement for actuating said gripper through a rod to a gear of said gripper, said gear converting the linear movement into two rotational motions with opposite, symmetrical paths.

17. The device according to claim 16 where in said gear includes a bevel-gear rotated by said rod and which engages with two further bevel-gears each driving an associated gripper-lever having a gripper-jaw for engaging the cable-end.

18. The device according to claim 17 wherein said further bevel-gears and said gripper-levers are arranged on an axle.

* * * * *